E. H. BRISTOL.
MOUNTING FOR INSTRUMENTS.
APPLICATION FILED DEC. 16, 1916.
1,338,766. Patented May 4, 1920.
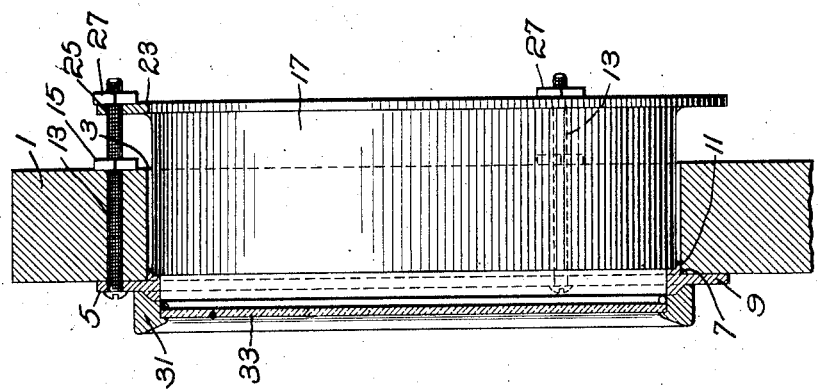
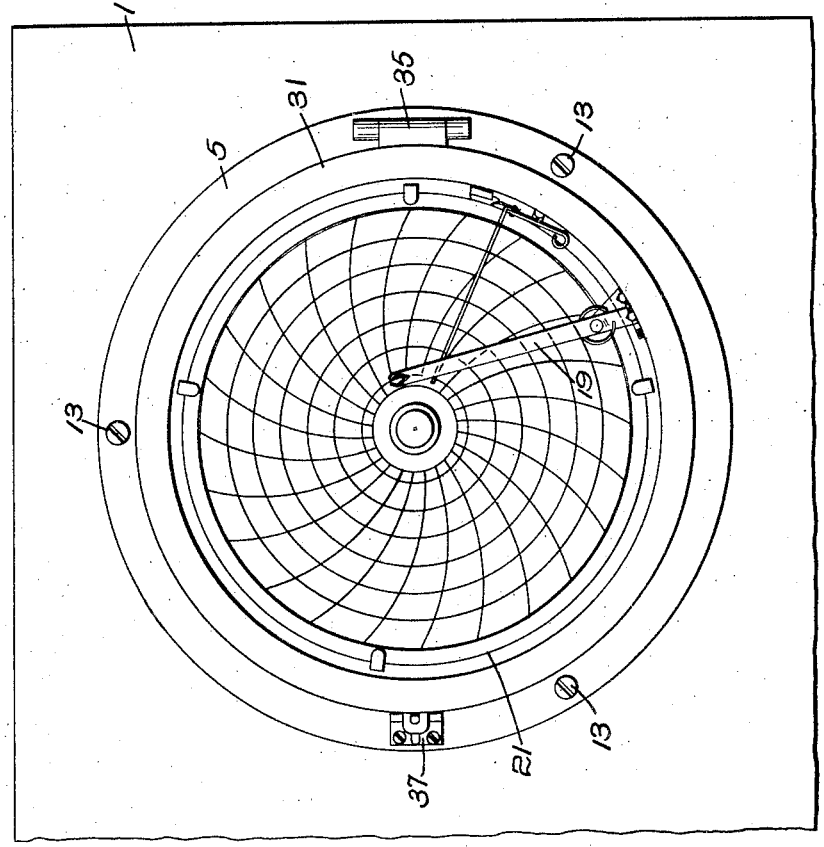
Inventor:
Edgar H. Bristol,
by Emery, Booth, Janney + Varney
Attys

UNITED STATES PATENT OFFICE.

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS.

MOUNTING FOR INSTRUMENTS.

1,338,766. Specification of Letters Patent. Patented May 4, 1920.

Application filed December 16, 1916. Serial No. 137,472.

*To all whom it may concern:*

Be it known that I, EDGAR H. BRISTOL, a citizen of the United States, and resident of Foxboro, county of Norfolk, and Commonwealth of Massachusetts, have invented an Improvement in Mountings for Instruments, of which the following description, in connection with the accompanying drawings, is a specification, like characters on the drawings representing like parts.

This invention relates to a mounting for instruments such as, for example, pressure-responsive devices and similar measuring or recording instruments. The object is to provide a simple, neat and secure manner of fastening such devices in position.

My invention will be best understood by reference to the following description taken in connection with the accompanying drawings showing an illustrative embodiment of my invention, wherein,—

Figure 1 is a front elevation of a portion of a support in which a recording pressure-responsive instrument is mounted in accordance with my invention; and Fig. 2 is a vertical section through Fig. 1, the case of the instrument being shown in elevation and partly broken away.

Referring to the drawings, I show at 1 a portion of the support, such, for example, as a switchboard in which it is desired to mount an instrument. By a switchboard will be understood the boards or panels common in industrial and other establishments in which a number of measuring, recording and controlling devices are assembled. The support 1 is apertured, as seen at 3 in Fig. 2, and at the forward side of the aperture is mounted a suitable frame 5 encircling the same and having a portion extending inwardly over the edge thereof. The frame 5 is preferably formed with a rabbet 7, shown in Fig. 2, fitting over the margin of the aperture 3 and providing a flange 9 fitting the front face of the support and another flange 11 extending into the aperture. As shown in Fig. 2, the flange 11 may itself be rabbeted for a purpose hereinafter to be more fully described.

To secure the frame 5 in position, I have here shown bolts 13 passing through the flange 9 and the support 1, and nuts 15 coöperating with the back face of the support to clamp the frame 5 in position.

In the present embodiment of the invention I have shown as the instrument to be mounted a recording instrument in a cylindrical case 17 of customary form and presenting an indicator 19 in the form of a recording pen adapted to trace a record on the removable dial or record sheet 21, as shown in Fig. 1. I have chosen this for illustration merely as an example of any kind of mechanism which it might be desired to mount securely and neatly. For convenience in description and definition, I shall refer to the device to be mounted as an instrument case, but it will be understood that I do this as a matter of convenience of language and not as a limitation of what the device itself shall be. The case 17 is adapted to enter the aperture 3 from the rear of the support 1 and to engage the part of the frame 5 which projects inwardly over the edge of this aperture. In particular, when the frame 5 has an inwardly directed, rabbeted flange 11 as herein described, the front end of the case 17 may fit the rabbet as shown in Fig. 2. In this position the indicator 19 and the dial 21 or like registering portion of the instrument are presented at the front of the support for inspection through the frame 5.

Means are provided for clamping the case 17 toward the support 1, thus holding it firmly in position in the aperture 3 and against the frame 5. Here, as shown, the case is provided with a circumferential flange 23 having openings 25 therein to receive fastening devices, as is customary in devices of this nature. The apertures 25 may take over the bolts 13 which fasten the frame 5 in position and nuts 27 may be utilized for clamping the case 17 in position against the inner side of frame 5. These nuts 27 are preferably independent of the nuts 15 and thus the instrument may be readily removed from the aperture for inspection or repair simply by removing the nuts 27 without disturbing the frame 5.

In the embodiment of the invention here illustrated, the frame 5 also constitutes a door casing on which may be mounted a door including a frame or bezel 31 and a glazing 33. As seen in Fig. 1, the door is hinged to the door casing or frame 5 at 35 and provided with a suitable latch 37 for holding it closed.

From this description of one illustrative embodiment of my invention, it will be apparent that I provide a secure form of mounting for a recording instrument or a similar mechanism, and one which is very simple and which presents a neat appearance. The instrument is partially housed in the switchboard or other support 1 and has no projecting portion from the front of the same liable to be struck in such manner as to cause damage. The mounting lends itself conveniently to use with a protecting door such as described, so that, while the instrument is always visible and is readily accessible for removal, it is neatly mounted out of harm's way.

Having thus described one embodiment of my invention, what I claim and desire to secure by Letters Patent is:

1. A device of the class described comprising, in combination, a support having an aperture, a frame about said aperture extending inwardly over the edge thereof, an instrument case entering the aperture from the other side of the support engaging the inwardly extending portion of said frame and presenting the registering or indicating portion of the instrument for inspection through said frame, bolts extending through the frame, the support and a part of said case, and separate nuts for clamping respectively the frame and the case to said support.

2. A device of the class described comprising, in combination, a support having an aperture, a peripheral frame about said aperture having a flange extending over the face of said support, bolts securing said flange to the support, an instrument case adapted to enter the aperture from the rear and bear against said frame to present the registering or indicating portion of the instrument for inspection through said frame, and means on said case for securing it to said bolts to hold the same in position.

3. A device of the class described comprising, in combination, a support having an aperture, a frame having a rabbet receiving the margin of said aperture, means securing one of the flanges of said rabbet to the support, an instrument case adapted to enter the aperture from the rear and engage said other flange to present the registering or indicating portion of the instrument for inspection through said frame, and means coöperating with said securing means for holding the case thereagainst.

4. A device of the class described comprising, in combination, a support having an aperture, a frame having a rabbet receiving the margin of said aperture, means securing one of the flanges of said rabbet to the support, the other flange being itself rabbeted, an instrument case adapted to enter said aperture from the rear and fit the second-mentioned rabbet, said case presenting the registering or indicating portion of the instrument for inspection through said frame, and means for clamping the case toward the support.

5. A device of the class described comprising, in combination, a support having an aperture, a door casing about said aperture, a door thereon comprising a bezel and a glazing, an instrument case in said aperture bearing against the door casing and having a registering or indicating portion visible through the doorway, bolts passing through said casing and support, and nuts coöperating with the support and instrument case for holding in position respectively said door casing and said instrument case.

6. A device of the class described comprising, in combination, a support having an aperture, a frame about said aperture, an instrument case entering the aperture from the other side of the support and engaging said frame, bolts extending through frame and support, nuts coöperating with said bolts for clamping together frame and support, said bolts also engaging the instrument case and other nuts coöperating with the bolts and pressing the case against the frame.

In testimony whereof I have signed my name to this specification.

EDGAR H. BRISTOL.